United States Patent

Arai

[11] Patent Number: 5,930,235
[45] Date of Patent: Jul. 27, 1999

[54] RADIO COMMUNICATION SYSTEM CAPABLE OF CARRYING OUT A DATA TRANSMISSION WITH A HIGH RELIABILITY

[75] Inventor: Koju Arai, Tokyo, Japan

[73] Assignee: NEC Corporation, Japan

[21] Appl. No.: 08/808,250

[22] Filed: Feb. 28, 1997

[30] Foreign Application Priority Data

Feb. 29, 1996 [JP] Japan .......................................... 43551

[51] Int. Cl.⁶ ............................. G01R 31/08; H04J 3/06
[52] U.S. Cl. .......................... 370/252; 370/350; 370/516
[58] Field of Search .................................... 370/321, 324,
370/337, 350, 332, 347, 252, 503, 507,
516, 517; 375/344, 357, 358

[56] References Cited

U.S. PATENT DOCUMENTS

| | | | |
|---|---|---|---|
| 5,278,848 | 1/1994 | Yamaguichi | 371/49.1 |
| 5,684,790 | 11/1997 | Hirsawa | 370/252 |
| 5,697,096 | 12/1997 | Aoki et al. | 455/343 |
| 5,781,056 | 7/1998 | Fujii | 327/276 |

FOREIGN PATENT DOCUMENTS 59-34738  2/1984  Japan .

*Primary Examiner*—Chau Nguyen
*Assistant Examiner*—Phuongchau Ba Nguyen
*Attorney, Agent, or Firm*—Ostrolenk, Faber, Gerb & Soffen, LLP

[57] ABSTRACT

A radio communication system comprises a master station for carrying out a bidirectional communication between the master station and a slave station in time division multiple access. The master station comprises comparator circuit for producing a phase difference data between a slave frame signal of a of a slave transmission signal and a master frame signal of a master transmission signal. A first detecting circuit produces a first detection signal representative of whether or not a field strength level is less than a predetermined level. The phase difference data and the first detection signal are transmitted to the slave station. The slave station comprises a delay circuit for give a delay to the slave transmission signal in accordance with a given phase difference. A supplying section is responsive to the first detection signal to selectively supply the delay means with the phase difference data as the given phase difference.

10 Claims, 2 Drawing Sheets

RADIO COMMUNICATION SYSTEM CAPABLE OF CARRYING OUT A DATA TRANSMISSION WITH A HIGH RELIABILITY

BACKGROUND OF THE INVENTION

This invention relates to a radio communication system for carrying out a communication between a master station and a plurality of slave stations by time division multiple access (TDMA).

In general, it is known that a radio communication system comprises a master station and a plurality of slave stations each of which communicates with the master station by time division multiple access. Such a radio communication system is disclosed as a conventional radio communication system in Japanese Patent Publication Tokkai Syo 59-34738 (34738/1984). In the conventional radio communication system, a specific one of the slave stations transmits a specific transmission signal to the master station by using a specific time slot which is assigned to the specific slave station. When the master station receives the specific transmission signal as a specific reception signal, the master station extracts a slave clock signal from the specific reception signal as will be later be described. The master station compares the slave clock signal with a reference clock signal to obtain a phase difference data representative of a phase difference between the slave clock signal and the reference clock signal. The phase difference data is transmitted from the master station to the specific slave station. The specific slave station controls the phase of a transmission data in accordance with the phase difference data. In other words, the specific slave station compensates a phase variation between the master station and the specific slave station in accordance with the phase difference data.

Inasmuch as the master station is connected to each of the slave stations by a radio channel, the transmission signal on the radio channel may be inevitably subjected to fading. As a result, error may occur in the phase difference data by fading. When the error occurs in the phase difference data by fading, it is difficult for the specific slave station to compensate the phase variation between the master station and the specific slave station. As a result, it is difficult to carry out a data transmission in the conventional radio communication system with a high reliability.

SUMMARY OF THE INVENTION

It is therefore an object of this invention to provide a radio communication system capable of carrying out a data transmission with a high reliability.

Other objects of this invention will become clear as the description proceeds.

On describing the gist of this invention, it is possible to understand that a radio communication system comprises a master station for carrying out a bidirectional communication between the master station and a slave station in time division multiple access. The master station transmits a master transmission signal having a master frame signal to the slave station. The slave station transmits a slave transmission signal having a slave frame signal to the master station.

According to this invention, the master station comprises (A) master comparator means for comparing the slave frame signal with the master frame signal to produce a phase difference between the slave frame signal and the master frame signal as a phase difference data, (B) first detecting means for detecting a field strength level in accordance with the slave transmission signal to judge whether or not the field strength level is less than a predetermined level, the first detecting means producing a field detection signal representative of detection of a field strength as a first detection signal when the field strength level is not less than the predetermined level, the first detecting means producing non-field detection signal representative of no detection of said field strength as the first detection when the field strength level is less than the predetermined level; and (C) master transmitting, the slave station, means for transmitting the phase difference data and the first detection signal carried on the master transmission signal. The slave station comprises (A) delay means for give a delay to the slave transmission signal in accordance with a given phase difference and (B) supplying means responsive to the first detection signal for selectively supplying the delay means with the phase difference data as the given phase difference.

DESCRIPTION OF THE PREFERRED EMBODIMENT

Figure 1:
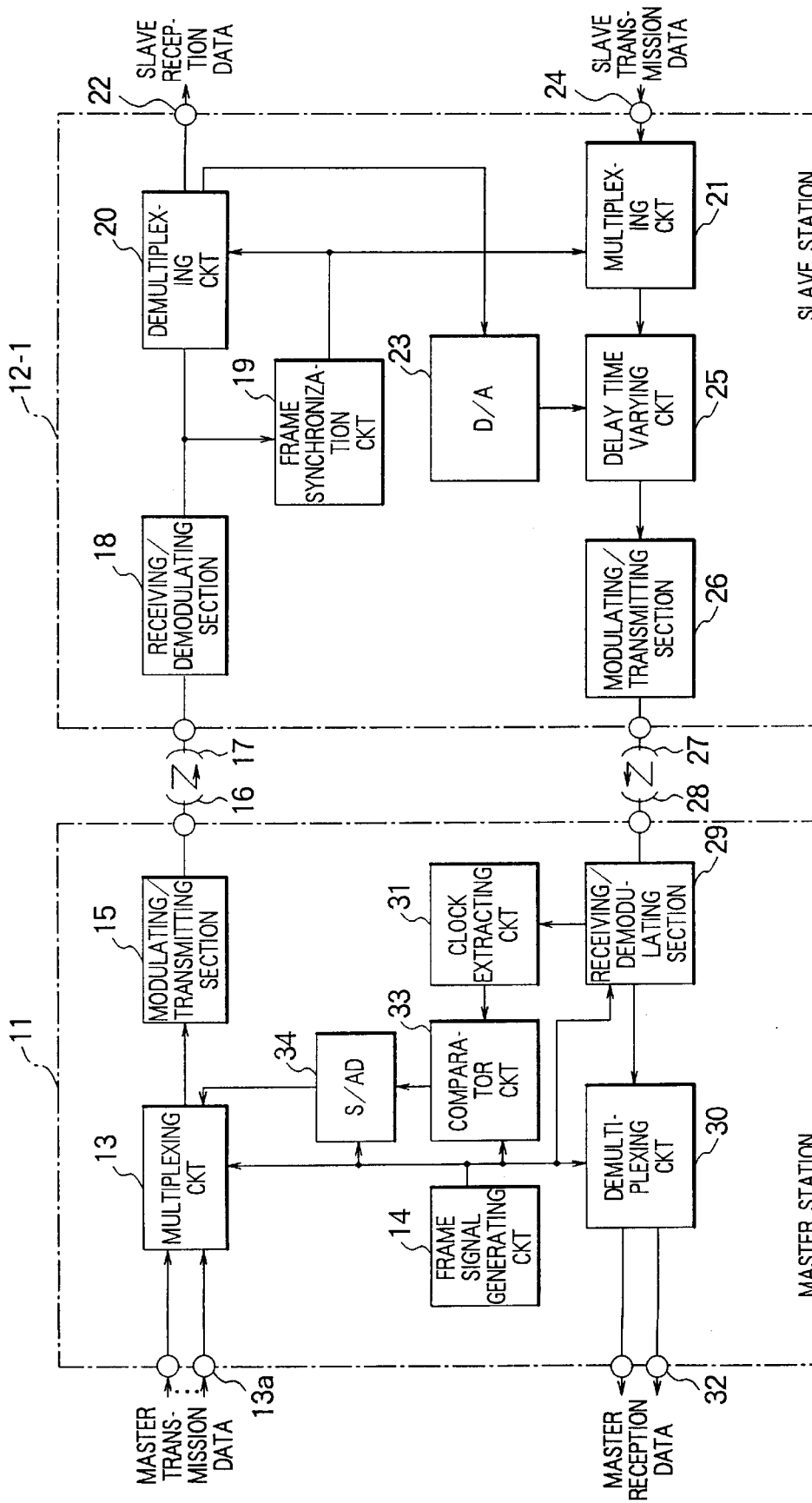
FIG. 1 is a block diagram of a conventional radio communication system.

Referring to FIG. 1, a conventional radio communication system will be described at first in order to facilitate an understanding of this invention. The radio communication system may use time division multiple access and comprises a master station 11 and first through N-th slave stations 12-1 to 12-N although only master station 11 and the first slave station 12-1 is illustrated in FIG. 1, where N represents a positive integer which is not less than one. The master station 11 communicates with the slave station 12-1 by a radio channel which has first through N-th time slots. The first time slot may be assigned to the slave station 12-1.

The master station 11 comprises a master multiplexing circuit 13 and a frame signal generating circuit 14 for generating a frame signal representative of a frame having first through N-th time slots. The master multiplexing circuit 13 is supplied with a first through N-th master transmission data from master input terminal 13a. The master multiplexing circuit 13 is further supplied with first through N-th phase difference signals which will be later described. The master multiplexing circuit 13 multiplexes the first through the N-th master transmission data and first through the N-th phase difference signals to produce a master multiplexed signal in time-division multiplexing fashion in accordance with the frame signal. More particularly, the master multiplexing circuit 13 produces the master multiplexed signal carrying the first through the N-th master transmission data and the first through the N-th phase difference signals on the first through the N-th time slots, respectively. The master multipled signal is supplied to a master modulating/transmitting section 15 to be modulated into a master modulated signal in the master modulating/transmitting section 15. The master modulating/transmitting section 15 transmits the master modulated signal as a master transmission signal through a master transmission antenna 16.

The slave station 12-1 receives the master transmission signal as a slave reception signal through a slave reception antenna 17. The slave station 12-1 comprises a slave receiving/demodulating section 18 which demodulates the slave reception signal into a slave demodulated signal. The slave demodulated signal is delivered to a frame synchronization circuit 19 and a slave demultiplexing circuit 20. Responsive to the slave demodulated signal, the frame synchronization circuit 19 reproduces the frame signal which is supplied to the slave demultiplexing circuit 20 and a slave multiplexing circuit 21. The slave demultiplexing circuit 20 demultiplexes the slave demodulated signal in accordance with the frame signal in order to obtain the first master transmission data as a slave reception data which is outputted from a slave output terminal 22. The slave demultiplexing circuit 20 further produces the first phase difference signal which is supplied to a digital-analog (D/A) converter 23.

When the slave station 12-1 is supplied with a slave transmission data from a slave input terminal 24, the slave multiplexing circuit 21 produces a slave multiplexed signal in accordance with the frame signal. More particularly, the slave multiplexing circuit 21 produces the slave multiplexed signal carrying the slave transmission data on the first or specific time slot. The slave multiplexed signal is supplied to a delay time varying circuit 25 to be compensated a phase variation between the master multiplexed signal and the slave multiplexed signal. More specifically, the D/A converter 23 converts the first phase difference signal into an analog signal to supply the analog signal to the delay time varying circuit 25. The delay time varying circuit 25 varies or controls the phase of the slave multiplexed signal on the basis of the analog signal to produce a phase varied slave multiplexed signal. The phase varied slave multiplexed signal is modulated into a slave modulated signal by a slave modulating/transmitting section 26 to be transmitted as a slave transmission signal through a slave transmission antenna 27.

The master station 11 receives the slave transmission signal as a master reception signal through a master reception antenna 28 at a receiving/demodulating section 29. The receiving/demodulating section 29 demodulates the master reception signal in accordance with the frame signal to produce a master demodulated signal which is supplied to a master demultiplexing circuit 30 and a clock extracting circuit 31. The master demultiplexing circuit 30 demultiplexes the master demodulated signal in accordance with the frame signal in order to obtain the first slave transmission data as a master reception data which is outputted from a master output terminal 32. Supplied with the master demodulated signal, the clock extracting circuit 31 extracts a reception clock signal from the master demodulated signal which is supplied to a phase comparator circuit 33.

The phase comparator circuit 33 is further supplied with the frame signal as a reference clock signal from the frame signal generating circuit 14. The phase comparator circuit 33 compares the reception clock signal with the reference clock signal to produce a phase difference value between the reception clock signal and the reference clock signal. The phase difference value is delivered to a sampling and analog-digital (S/AD) converter 34. The S/AD converter 34 samples the phase difference value at a predetermined sampling rate to produce a sampled phase difference value. The S/AD converter 34 carries out an analog-digital conversion of the sampled phase difference value to supply a digital phase difference value as the first phase difference signal to the master multiplexing circuit 13.

By the way, the transmission signal on the radio channel may be inevitably subjected to fading. As a result, error may occur in the phase difference data by fading. When the error occurs in the phase difference data by fading, it is difficult for the slave station to compensate the phase variation between the master transmission signal and the slave transmission signal. As a result, it is difficult to carry out the data transmission between the master station and the slave station in the conventional radio communication system with a high reliability.

Figure 2:
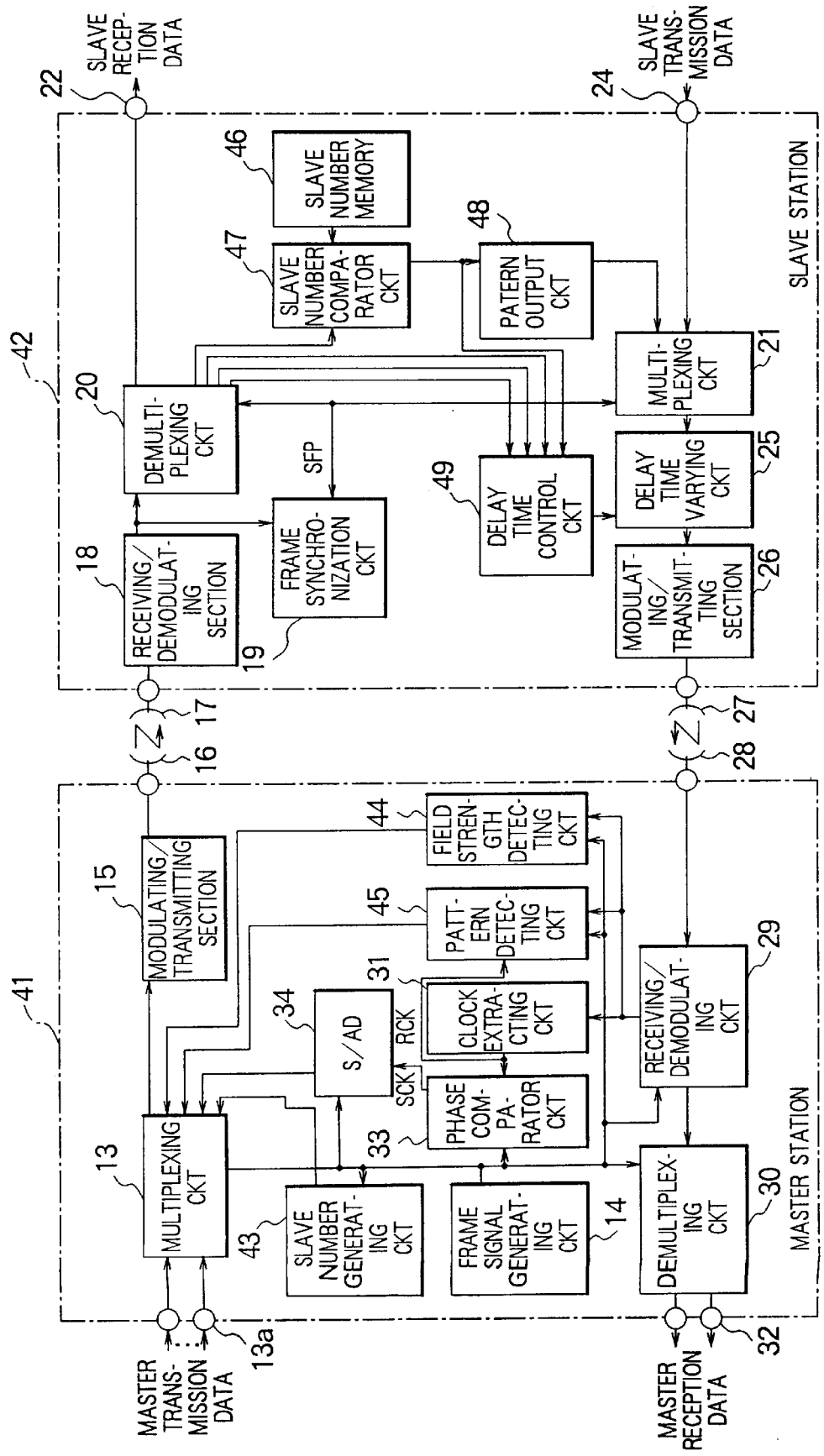
FIG. 2 is a block diagram of a radio communication system according to a preferred embodiment of this invention.

Referring to FIG. 2, description will proceed to a radio communication system according to a preferred embodiment of this invention. The illustrated radio communication system comprises a master station and first through N-th slave stations although only the master station and the first slave station is illustrated in FIG. 2, where N represents a positive integer which is not less than one. The master station and the first slave station are different in structure from the master station 11 and the slave station 12-1 illustrated in FIG. 1 and are therefore designated afresh by reference numerals 41 and 42, respectively. The radio communication system comprises similar parts which are designated by like reference numerals and operable with likewise named signals.

The master station 41 further comprises a slave number generating circuit 43, a field strength detecting circuit 44, and a pattern detecting circuit 45. The slave number generating circuit 43 generates first through N-th slave numbers which are supplied to the master multiplexing circuit 13. The field strength detecting circuit 44 detects a field strength on the basis of a slave transmission signal to supply a field detection signal to the master multiplexing circuit 13 as will be later be described. The pattern detecting circuit 45 detects a frame synchronization pattern on the basis of the slave transmission signal to supply a pattern detection signal to the master multiplexing circuit 13 as will be later described.

The first slave station 42 further comprises a slave number memory circuit 46, a slave number comparator circuit 47, a pattern output circuit 48, and a delay time-control circuit 49, all of which will be later described.

The slave number generating circuit 43 selectively generates the first through the N-th slave numbers in an ascending order in case where the radio communication system comprises the first through the N-th slave stations. It will be assumed that the slave number generating circuit 43 generates a specific one of the first through the N-th slave numbers. Responsive to the specific slave number, the master multiplexing circuit 13 produces a polling signal carrying the specific slave number in accordance with the frame signal to supply the polling signal to the modulating/transmitting section 15. The modulating/transmitting section 15 modulates the polling signal into a modulated polling signal to transmit the modulated polling signal as the master transmission signal through the master transmission antenna 16.

The first slave station 42 receives master transmission signal as the slave reception signal at the slave receiving/demodulating section 18 through the slave reception antenna 17. The slave receiving/demodulating section 18 demodulates the slave reception signal into the slave demodulated signal. Responsive to the slave demodulated signal, the frame synchronization circuit 19 reproduces the frame signal which is supplied to the slave demultiplexing circuit 20 and the slave multiplexing circuit 21. The slave demultiplexing circuit 20 demultiplexes the slave demodulated signal in accordance with the frame signal to produce a specific slave number signal representative of the specific slave number. The specific slave number signal is supplied to the slave number comparator circuit 47.

The slave number memory circuit 46 is for memorizing a memorized slave number own to the slave station 42.

Responsive to the specific slave number signal, the slave number comparator circuit 47 access the slave number memory circuit 46 to read the memorized slave number as a read slave number out of the slave number memory circuit 46. The slave number comparator circuit 47 compares the read slave number with the specific slave number. When the read slave number is not coincident with the specific slave number, the slave number comparator circuit 47 produces a non-coincident signal which is supplied to the pattern output circuit 48 and the delay time control circuit 49. Each of the pattern output circuit 48 and the delay time control circuit 49 is put out of operation in response to the non-coincident signal.

When the read slave number is coincident with the specific slave number, the slave number comparator circuit 47 produces a coincident signal which is supplied to the pattern output circuit 48 and the delay time control circuit 49. Responsive to the coincident signal, the pattern output circuit 48 outputs a predetermined frame synchronization pattern to supply the predetermined frame synchronization pattern to the slave multiplexing circuit 21. The slave multiplexing circuit 21 may be supplied with the slave transmission data from the slave input terminal 24. The slave multiplexing circuit 21 multiplexes the slave transmission data and the predetermined frame synchronization pattern to produce the slave multiplexed signal.

The delay time control circuit 49 is put into a waiting state in response to the coincident signal. In order to process the slave multiplexed signal into the phase varied slave multiplexed signal, the delay time varying circuit 25 gives a delay to the slave multiplexed signal in accordance with a given phase difference data which is previously given by the delay time control circuit 49. Supplied with the phase varied slave multiplexed signal, the slave modulating/transmitting section 26 modulates the phase varied slave multiplexed signal into the slave modulated signal to transmit the slave modulated signal as the slave transmission signal through the slave transmission antenna 27.

The master station 41 receives the slave transmission signal as the master reception signal through the master reception antenna 28 at the receiving/demodulating section 29. The receiving/demodulating section 29 demodulates the master reception signal in accordance with the frame signal to produce the master demodulated signal which is supplied to the master demultiplexing circuit 30, the clock extracting circuit 31, the field strength detecting circuit 44, and the pattern detecting circuit 45. The master demultiplexing circuit 30 demultiplexes the master demodulated signal in accordance with the frame signal in order to obtain the first slave transmission data as the master reception data which is outputted from a master output terminal 32.

Supplied with the master demodulated signal, the clock extracting circuit 31 extracts the reception clock signal RCK from the master demodulated signal. The reception clock signal is supplied to the phase comparator circuit 33 and the pattern detecting circuit 45.

The phase comparator circuit 33 is further supplied with the frame signal as the reference clock signal from the frame signal generating circuit 14. The phase comparator circuit 33 compares the reception clock signal with the reference clock signal to produce the phase difference value between the reception clock signal and the reference clock signal. The phase difference value is delivered to the sampling and analog-digital (S/AD) converter 34. The S/AD converter 34 samples the phase difference value at the predetermined sampling rate to produce the sampled phase difference value.

The S/AD converter 34 carries out an analog-digital conversion of the sampled phase difference value to supply a digital phase difference value as the phase difference data to the master multiplexing circuit 13.

The field strength detecting circuit 44 is supplied with the master demodulated signal and detects a level of the frame synchronization pattern as a detected level in accordance with the frame signal to judge whether or not the detected level is not less than a predetermined level. When the detected level is not less than the predetermined level, the field strength detecting circuit 44 produces a field detection signal to supply the field detection signal to the master multiplexing circuit 13. When the detected level is less than the predetermined level, the field strength detecting circuit 44 produces a non-field detection signal to supply the non-field detection signal to the master multiplexing circuit 13. In other words, the master multiplexing circuit 13 is supplied with a first detection signal representative of whether or not the detected level is not less than the predetermined level.

On the other hand, the pattern detecting circuit 45 is supplied with the master demodulated signal and detects the frame synchronization pattern in accordance with the frame signal and the reception clock signal. When the frame synchronization pattern is detected, the pattern detecting circuit 45 produces a pattern detection signal to supply the pattern detection signal to the master multiplexing circuit 13. When the frame synchronization pattern is not detected, the pattern detecting circuit 45 produces a non-pattern detection signal to supply the non-pattern detection signal to the master multiplexing circuit 13. In the other words, the master multiplexing circuit 13 is supplied with a second detection signal representative of whether or not frame synchronization pattern is detected.

The above-mentioned phase difference data and the first and the second detection signals are supplied as an adjusting data with the master multiplexing circuit 13. The master multiplexing circuit 13 multiplexes the master transmission data and the adjusting data to produce the master multiplexed signal in accordance with the frame signal. The master multiplexed signal is supplied to the master modulating/transmitting section 15 to be modulated into the master modulated signal in the master modulating/transmitting section 15. The master modulating/transmitting section 15 transmits the master modulated signal as the master transmission signal through the master transmission antenna 16.

The slave station 42 receives the master transmission signal as the slave reception signal through the slave reception antenna 17. The slave receiving/demodulating section 18 demodulates the slave reception signal into the slave demodulated signal. The slave demodulated signal is delivered to the frame synchronization circuit 19 and the slave demultiplexing circuit 20. Responsive to the slave demodulated signal, the frame synchronization circuit 19 reproduces the frame signal. The slave demultiplexing circuit 20 demultiplexes the slave demodulated signal in accordance with the frame signal in order to obtain the master transmission data as the slave reception data which is outputted from the slave output terminal 21. The slave demultiplexing circuit 20 further produces the adjusting data which is supplied to the delay time control circuit 49.

The delay time control circuit 49 controls the delay time varying circuit 25 in accordance with the adjusting data so that the delay time varying circuit 25 minimizes the phase variation of the master transmission signal and the slave transmission signal.

It will be assumed that the radio channel is subjected to fading. On the basis of fading, the phase comparator circuit 33 may produce an error phase difference data. In this event, the field strength detecting circuit 44 produces the non-field detection signal inasmuch as the detected level is less than the predetermined level. Similarly, the pattern detecting circuit 45 produces the non-pattern detection signal inasmuch as the pattern detecting circuit 45 does not detect the frame synchronization pattern.

When the delay time control circuit 49 is supplied with at least one the non-pattern detection signal and the non-pattern detection signal, the delay time control circuit 49 stops control of the delay time varying circuit 25 so that delay time varying circuit 25 compensates the phase variation between the master transmission signal and the slave transmission signal in accordance with a prior phase difference data. Specifically, the delay time control 49 supplies the phase difference data as the given phase difference data to the delay time varying circuit 25 in response to at least one of the field detection signal and the pattern detection signal.

While this invention has thus far been described in conjunction with the preferred embodiment thereof, it will readily be possible for those skilled in the art to put this invention into practice in various other manners.

What is claimed is:

1. A radio communication system comprises a master station for carrying out a bidirectional communication between said master station and a slave station in time division multiple access, said master station transmitting a master transmission signal having a master frame signal to said slave station, said slave station transmitting a slave transmission signal having a slave frame signal to said master station, wherein:

said master station comprises:
  master comparator means for comparing said slave frame signal with said master frame signal to produce a phase difference between said slave frame signal and said master frame signal as phase difference data;
  first detecting means for detecting a field strength level in accordance with said slave transmission signal to judge whether or not said field strength level is less than a predetermined level, said first detecting means producing a field detection signal representative of detection of a field strength as a first detection signal when said field strength level is not less than said predetermined level, said first detecting means producing a non-field detection signal representative of no detection of said field strength as said first detection signal when said field strength level is less that said predetermined level; and
  master transmitting means for transmitting, to said slave station, said phase difference data and said first detection signal carried on said master transmission signal;

said slave station comprising:
  delay means for delaying said slave transmission signal in accordance with a given phase difference; and
  supplying means responsive to said first detection signal for selectively supplying said delay means with said phase difference data as said given phase difference.

2. A radio communication system as claimed in claim 1, wherein said supplying means supplies said delay means with said phase difference data as said given phase difference when said first detection signal is said field detection signal.

3. A radio communication system as claimed in claim 2, wherein said slave station further comprises frame pattern generating means for generating a predetermined frame pattern to carry said predetermined frame pattern on said slave transmission signal.

4. A radio communication system as claimed in claim 3, wherein said master station further comprises second detecting means for detecting said predetermined frame pattern on the basis of said slave transmission signal to produce a pattern detection signal as a second detection signal when said predetermined frame pattern is detected, said second detecting means producing a non-pattern detection signal as said second detection signal when said predetermined frame pattern is not detected.

5. A radio communication system as claimed in claim 4, wherein said master transmitting means transmits said second detection signal in addition to said phase difference data and said first detection signal on said master transmission signal.

6. A radio communication system as claimed in claim 5, said supplying means is responsive to at least one of said first and said second detection signals for selectively supplying said delay means with said phase difference data as said given phase difference.

7. A radio communication system as claimed in claim 6, wherein said supplying means supplies said delay means with said phase difference data as said given phase difference when said second detection signal is said pattern detection signal.

8. A radio communication system as claimed in claim 3, wherein said master station further comprises slave number generating means for generating a specific slave number to carry said specific slave number on said master transmission signal.

9. A radio communication system as claimed in claim 8, wherein:

said slave station further comprises a memory means for memorizing an own slave number own to said slave station; and
slave number comparator means for comparing said specific slave number with said own slave number to produce a coincident signal when said specific slave number is coincident with said own slave number;
said frame pattern generating means being responsive to said coincident signal for generating said predetermined frame pattern.

10. A radio communication system as claimed in claim 1, wherein said master comparator means comprises:

an extracting circuit said slave frame signal as a reception clock signal from said slave transmission signal; and
a master comparator circuit for comparing said slave frame signal with said master frame signal to produce said phase difference between said slave frame signal and said master frame signal as said phase difference data.

* * * * *